(12) United States Patent
Takahashi et al.

(10) Patent No.: US 8,762,264 B2
(45) Date of Patent: *Jun. 24, 2014

(54) COMMUNICATION SYSTEM AND INFORMATION PROCESSING METHOD

(75) Inventors: Hideaki Takahashi, Tokyo (JP); Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 439 days.

This patent is subject to a terminal disclaimer.

(21) Appl. No.: 12/659,322

(22) Filed: Mar. 4, 2010

(65) Prior Publication Data

US 2010/0169211 A1    Jul. 1, 2010

Related U.S. Application Data

(63) Continuation of application No. 09/933,715, filed on Aug. 22, 2001, now Pat. No. 7,693,786.

(30) Foreign Application Priority Data

Aug. 23, 2000  (JP) ................................. 2000-258136

(51) Int. Cl.
*G06Q 40/00* (2012.01)
(52) U.S. Cl.
USPC .............................................. 705/39; 705/35
(58) Field of Classification Search
None
See application file for complete search history.

(56) References Cited

U.S. PATENT DOCUMENTS

| | | | | |
|---|---|---|---|---|
| 5,992,738 A | * | 11/1999 | Matsumoto et al. | 235/381 |
| 6,009,412 A | * | 12/1999 | Storey | 705/14.27 |
| 6,105,008 A | * | 8/2000 | Davis et al. | 705/41 |
| 6,282,522 B1 | * | 8/2001 | Davis et al. | 705/41 |
| 6,415,261 B1 | * | 7/2002 | Cybul et al. | 705/14.23 |
| 6,549,912 B1 | * | 4/2003 | Chen | 1/1 |
| 6,594,640 B1 | * | 7/2003 | Postrel | 705/14.27 |

FOREIGN PATENT DOCUMENTS

| | | |
|---|---|---|
| JP | 10-040430 A | 2/1998 |
| JP | 11-085862 A | 3/1999 |
| JP | 11-250353 A | 9/1999 |
| JP | 2000-132746 A | 5/2000 |
| JP | 2000-207334 A | 7/2000 |

OTHER PUBLICATIONS

"Citibank, Cathay Pacific launch new credit card." Business World. Manila: Jul. 7, 1999. p. 1.*
Japanese Office Action issued Oct. 20, 2009 for corresponding Japanese Application No. 2000-258136.
Higgins et al, "Takeoffs & Landings" Wall Street Journal, New York, NY, Sep. 24, 1999, p. W5.

* cited by examiner

*Primary Examiner* — Olabode Akintola
(74) *Attorney, Agent, or Firm* — Rader, Fishman & Grauer PLLC

(57) ABSTRACT

A network transaction server apparatus manages virtual world privilege information that is issued for a transaction that a user has conducted in a virtual world by manipulating a personal computer. A settlement server apparatus manages real world privilege information that is issued for a transaction that the user has conducted in a real world. In response to a request from the personal computer, the settlement server apparatus converts virtual world privilege information that is managed by the network transaction server apparatus into real world privilege information using a prescribed conversion factor.

19 Claims, 8 Drawing Sheets

COMMUNICATION SYSTEM AND INFORMATION PROCESSING METHOD

CROSS REFERENCES TO RELATED APPLICATION

This is a Continuation Application of U.S. patent application Ser. No. 09/933,715, filed Aug. 22, 2001, which in turn claims priority from Japanese Application No. P2000-258136, filed on Aug. 23, 2000, the entire contents of which are incorporated herein by reference.

BACKGROUND OF THE INVENTION

1. Field of the Invention

The present invention relates to a communication system and an information processing method that are characterized by processing that relates to privilege information (e.g., a point in a consumer transaction point-accumulation system) that is issued in accordance with an act, such as a transaction that has been performed by a user in each of a real world and a virtual world.

2. Description of the Related Art

Conventionally, for example, when a user buys a commodity in a real world, for example, in a store, a user ID (identification information) that is stored in a credit card of the user is read by a terminal apparatus that is installed in the store and sent together with price information on the commodity to a settlement server apparatus. The settlement server apparatus performs settlement processing.

For example, in a transaction that is conducted by a user in a real world by using a credit card, points are issued in accordance with, for example, the amount of money paid by the user. The user receives a certain service in accordance with the points that has been accumulated by him.

On the other hand, in recent years, with the spread of electronic commerce, events have increased that, for example, in a virtual world called "cyber world" provided by a server apparatus on a network, a registered user selects a commodity by manipulating a home personal computer using his or her own user ID while looking at a commodity introduction picture that is provided by the server apparatus and sends a request for allowing him to buy the selected commodity to the server apparatus, and the server apparatus performs related settlement processing.

In such a virtual world, as in a real world, points are issued to each registered user in accordance with his or her act in the virtual world and each user receives a certain service in accordance with the points that have been accumulated by him or her.

However, there is a problem in the art that where a user is acting in both a real world and a virtual world, privilege information, such as points, that he has acquired in one world cannot be used in the other world.

SUMMARY OF THE INVENTION

The present invention has been made in view of the above problems in the art; and, an object of the invention is therefore to provide a communication system and an information processing method that allow a user to use the privilege information that he has acquired in one of a real world and a virtual world in the other world in case where the privilege information is issued in accordance with an act that is performed by him in each world.

To attain the above object by solving the above problems in the art, a first aspect of the invention provides a communication system comprising a first management apparatus for managing the first privilege information generated in accordance with a transaction that is conducted by a user via a network in a virtual world and the first identification information to be used for identifying the user in such a manner that they are correlated with each other and a the second management apparatus for managing second privilege information that is generated in accordance with a transaction conducted by the user in a real world and second identification information to be used for identifying the user in such a manner that they are correlated with each other, wherein at least one of the first management apparatus and the second management apparatus converts the first or second privilege information that is managed by the other into privilege information to be managed by itself and manages the privilege information obtained by the conversion.

A second aspect of the invention provides an information processing method comprising the steps of managing the first privilege information generated in accordance with a transaction that is conducted by a user via a network in a virtual world by manipulating a terminal apparatus and the first identification information to be used for identifying the user in such a manner that they are correlated with each other and managing the second privilege information generated in accordance with a transaction that is conducted by the user in a real world and the second identification information to be used for identifying the user in such a manner that they are correlated with each other, converting, by at least one of a first management apparatus and a second management apparatus, the first or second privilege information that is managed by the other into privilege information to be managed by itself, and managing the privilege information obtained by the conversion.

DESCRIPTION OF THE PREFERRED EMBODIMENT

A communication system according to an embodiment of the present invention will be hereinafter described.

Figure 1:
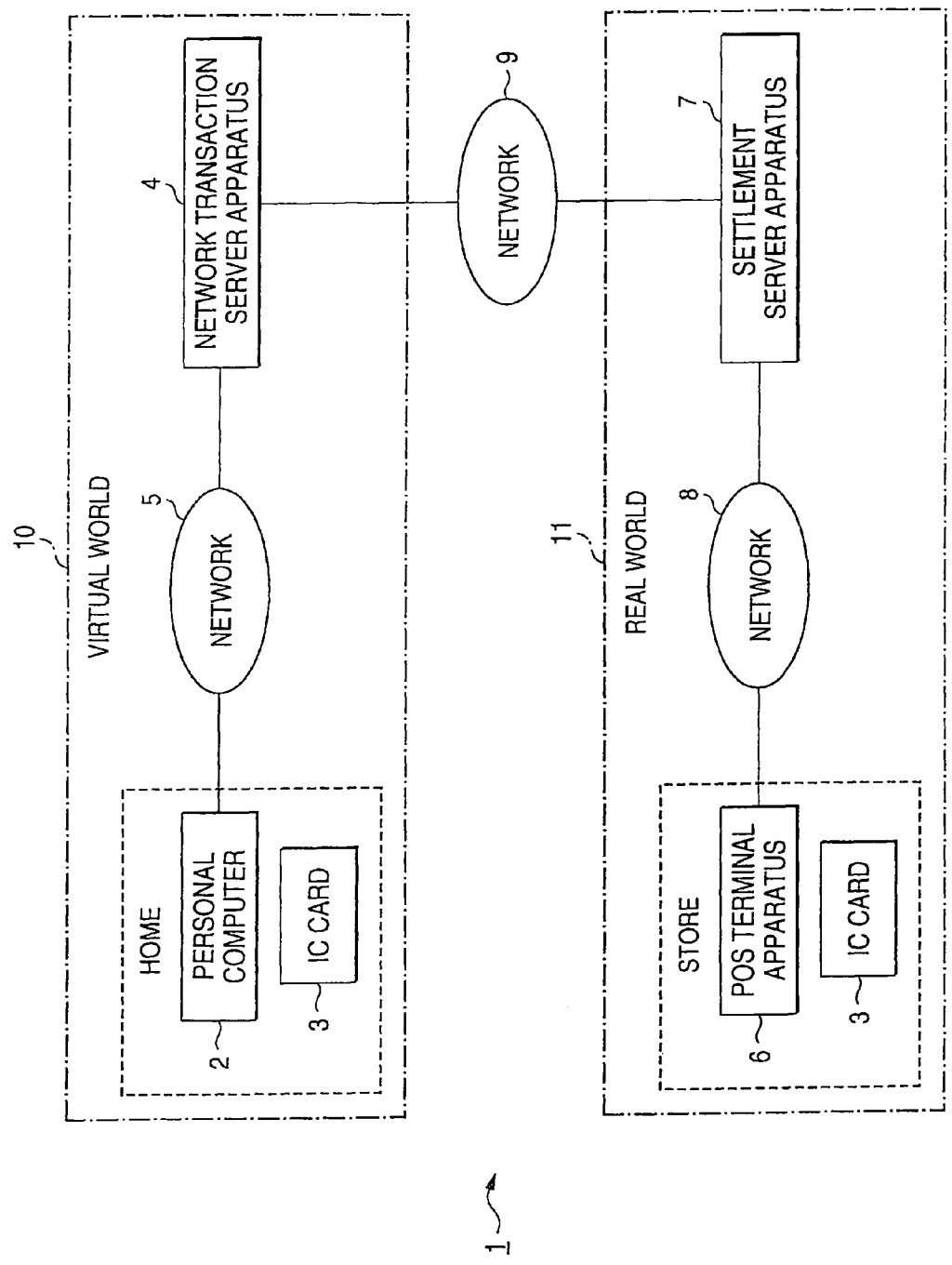
FIG. 1 shows the entire configuration of a communication system according to an embodiment of the present invention.

FIG. 1 shows the entire configuration of a communication system 1 according to the embodiment.

As shown in FIG. 1, in the communication system 1, a personal computer 2 and a network transaction server apparatus 4 are connected to each other via a network 5, a POS (point of sale) terminal apparatus 6 and a settlement server apparatus 7 are connected to each other via a network 8, and the network transaction server apparatus 4 and the settlement server apparatus 7 are connected to each other via a network 9.

For example, the personal computer 2, the network 5, and the network transaction server apparatus 4 realize commerce in a virtual world 10, such as a cyber net. The POS terminal apparatus 6, the network 8, and the settlement server apparatus 7 realize commerce in a real world 11.

The network transaction server apparatus 4 and the settlement server apparatus 7 correspond to the first management apparatus and the second management apparatus, respectively, in the invention.

The individual components of the communication system 1 will be described below.

Personal Computer 2

Figure 2:
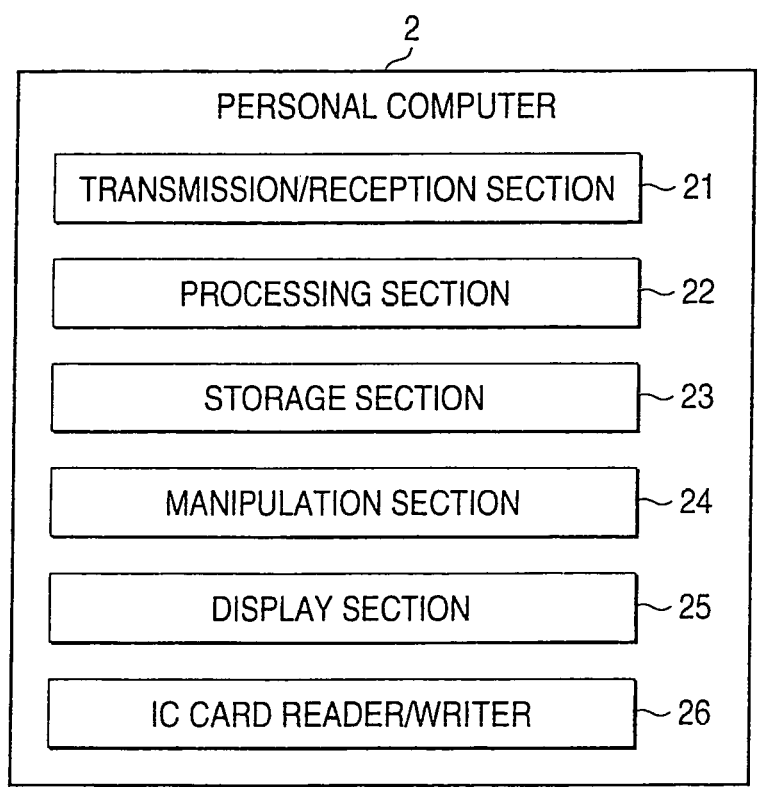
FIG. 2 is a functional block diagram of the personal computer shown in FIG. 1.

FIG. 2 is a functional block diagram of the personal computer 2. For example, the personal computer 2, which is installed in a user's home, has a transmission/reception section 21, a processing section 22, a storage section 23, a manipulation section 24, a display section 25, and an IC card reader/writer 26.

The transmission/reception section 21 sends and receives a request or information to and from the network transaction server apparatus 4 via the network 5 (see FIG. 1).

The processing section 22 performs prescribed processing (described later) in accordance with a manipulation signal that is input through the manipulation section 24 or a request or information that is received from the network transaction server apparatus 4.

The storage section 23 stores various kinds of information that are necessary for processing in the personal computer 2.

The manipulation section 24 generates a manipulation signal in accordance with a manipulation that is performed by the user by using a mouse, a keyboard, or the like, and outputs it to the processing section 22.

The display section 25 displays a picture corresponding to a display signal that is input from the processing section 22.

The IC card reader/writer 26 writes and reads information to and from an IC card 3 under the control of the processing section 22.

The personal computer 2 receives an image signal of a picture that introduces commodities, etc. from the network transaction server apparatus 4 in accordance with a manipulation that is performed by the user through the manipulation section 24, and displays the picture on the display section 25.

The personal computer 2 sends a commodity buying request for a commodity that has been specified by the user to the network transaction server apparatus 4 via the network 5.

The personal computer 2 reads the user ID from the IC card 3 of the user using the IC card reader/writer 26 shown in FIG. 2 and sends the user ID and a price to the network transaction server apparatus 4. The network transaction server apparatus 4 performs settlement processing based on the user ID and the price that are received from the personal computer 2.

The commodity, as a subject of the commodity buying request of the user is delivered to the user, by a related company by mail, for example.

IC Card 3

The IC card 3 stores the user ID, for example, of the user as the owner of the IC card 3. A transaction that is accompanied by settlement, etc. is conducted by using the user ID in both the virtual world 10 and the real world 11.

The IC card 3 can be used not only for applications using the user ID but also for other various applications such as a digital cash application.

It is possible to write and read information to and from the IC card 3 by a non-contact method, for example.

Network Transaction Server Apparatus 4

The network transaction server apparatus 4 is a server apparatus that performs processing relating to an electronic commerce act that is performed by the user via the network 5 by using the personal computer 2 of FIG. 2.

Figure 3:
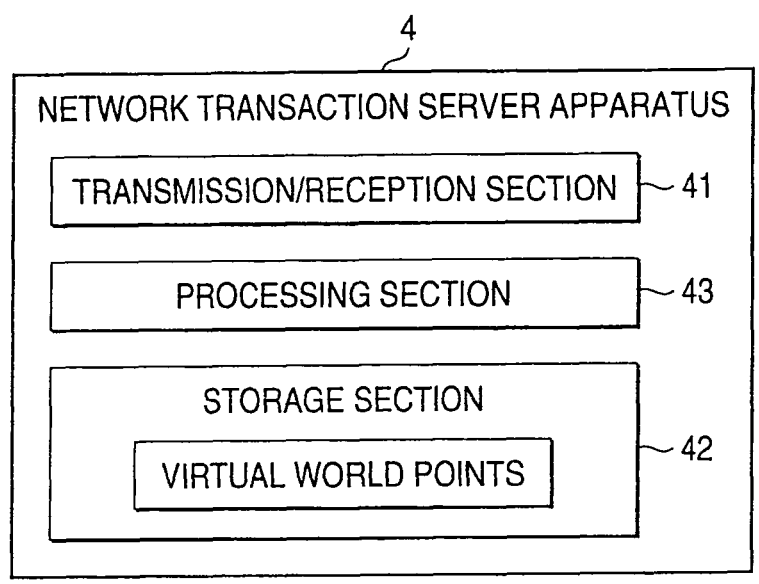
FIG. 3 is a functional block diagram of the network transaction server apparatus shown in FIG. 1.

FIG. 3 is a functional block diagram of the network transaction server apparatus 4.

As shown in FIG. 3, the network transaction server apparatus 4 has, for example, a transmission/reception section 41, a storage section 42, and a processing section 43.

The transmission/reception section 41 not only sends and receives a request or information to and from the personal computer 2 via the network 5, but also sends and receives a request or information to and from the settlement server apparatus 7 via the network 9.

The storage section 42 stores a user ID, a password, and personal information of each registered user who owns an IC card 3.

The storage section 42 stores historical information of the manipulations and procedures that have been performed or followed by each user and virtual world privilege information (the first privilege information in the invention e.g., a point) that has been issued to the user in accordance with transactions conducted by the user in the virtual world 10 in such a manner that they are correlated with the user's ID.

The virtual world privilege information is information that is issued in accordance with an act performed by each user in the virtual world 10 and that is used for judging his credibility or contribution to the virtual world 10. In accordance with virtual world privilege information that each user has acquired, an upper amount of money he is allowed to use in the virtual world 10 is set or he is given a certain profit, such as digital cash, or a discount from a commodity price.

Privilege information that is issued to each user may be determined in accordance with the number of times of transmission, the frequency of transmission, or the like.

The processing section 43 reads virtual world privilege information from the storage section 42 and sends it to the settlement server apparatus 7 in response to virtual world privilege information request from the settlement server apparatus 7.

Further, the processing section 43 performs the following processing in response to a request from the personal computer 2.

Figure 4:
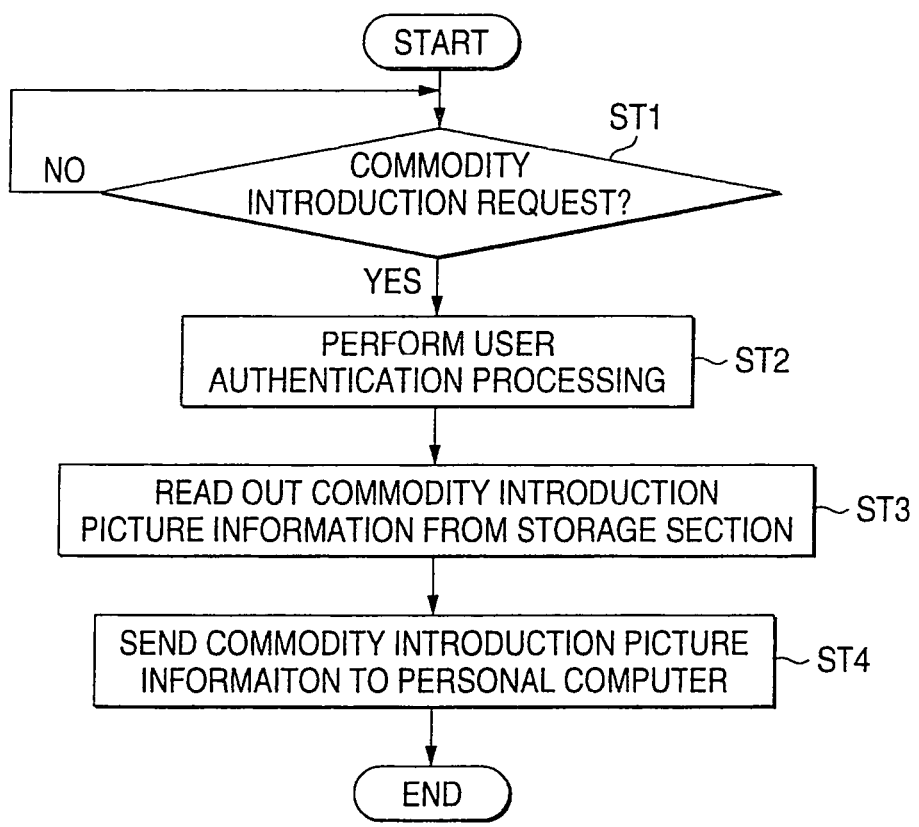
FIG. 4 is a flowchart showing the process that is executed by the processing section shown in FIG. 3 when it receives a commodity introduction request from the personal computer shown in FIG. 1.

First, a description will be given of the processing that is performed in the processing section 43 when it receives a commodity introduction request from the personal computer 2. FIG. 4 is a flowchart of this process.

Step ST1: If the processing section 43 judges that the transmission/reception section 41 has received a commodity introduction request from the personal computer 2, the processing section 43 moves to step ST2. If it judges otherwise, the processing section 43 executes step ST1 repeatedly.

Step ST2: Using a user ID, a password, etc. that are received from the personal computer 2 and information of the user that is stored in the storage section 42, the processing section 43 performs user authentication processing in which whether the user is a legitimate user who is registered is judged. If the legitimacy of the user is confirmed, the processing section 43 moves to step ST3.

Step ST3: The processing section 43 reads commodity introduction picture information from the storage section 42.

Step ST4: The processing section 43 sends the commodity introduction picture information that was read out at step ST3 to the personal computer 2 via the transmission/reception section 41.

Figure 5:
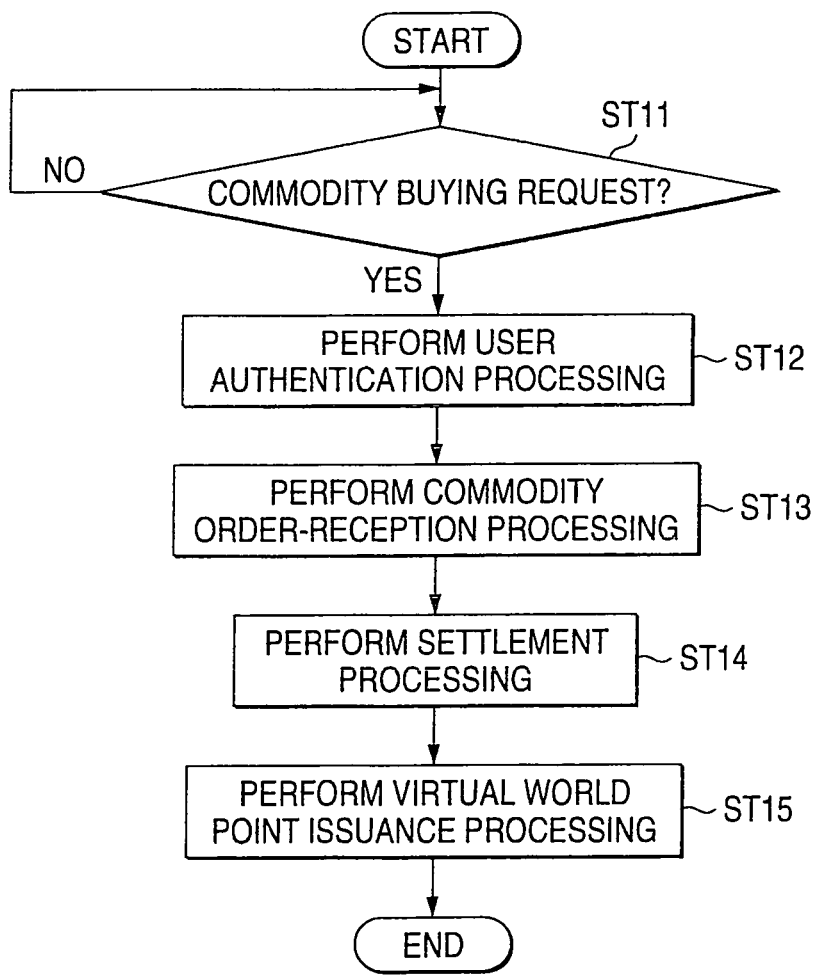
FIG. 5 is a flowchart showing the process that is executed by the processing section shown in FIG. 3 when it receives a commodity buying request from the personal computer 2 shown in FIG. 1.

Next, a description will be given of the processing that is performed in the processing section 43 when it receives a commodity buying request from the personal computer 2. FIG. 5 is a flowchart of this process.

Step ST11: If the processing section 43 judges that the transmission/reception section 41 has received a commodity buying request from the personal computer 2, the processing section 43 moves to step ST12. If it judges otherwise, the processing section 43 executes step ST11 repeatedly.

Step ST 12: Using a user ID, a password, etc. that are received from the personal computer 2 and information of the user that is stored in the storage section 42, the processing section 43 performs user authentication processing in which whether the user is a legitimate user who is registered is judged. If the legitimacy of the user is confirmed, the processing section 43 moves to step ST13.

Step ST13: The processing section 43 performs order-reception processing for the user's order of a commodity that is indicated by the commodity buying request that was received at step ST11. Specifically, the processing section 43 writes information, such as the type, the number of pieces, a delivery destination, etc., of the ordered commodity to the storage section 42.

Step ST14: The processing section 43 performs settlement processing on the buying of the commodity concerned for the user who issued the commodity buying request that was received at step ST11.

Step ST15: The processing section 43 issues virtual world privilege information for the buying of the commodity concerned by the user according to predetermined standards, adds the issued virtual world privilege information to total virtual world privilege information that the user has acquired so far, and writes updated total virtual world privilege information to the storage section 42. At this time, the processing section 43 issues virtual world privilege information in accordance with the amount of money settled.

POS Terminal Apparatus 6

Figure 6:
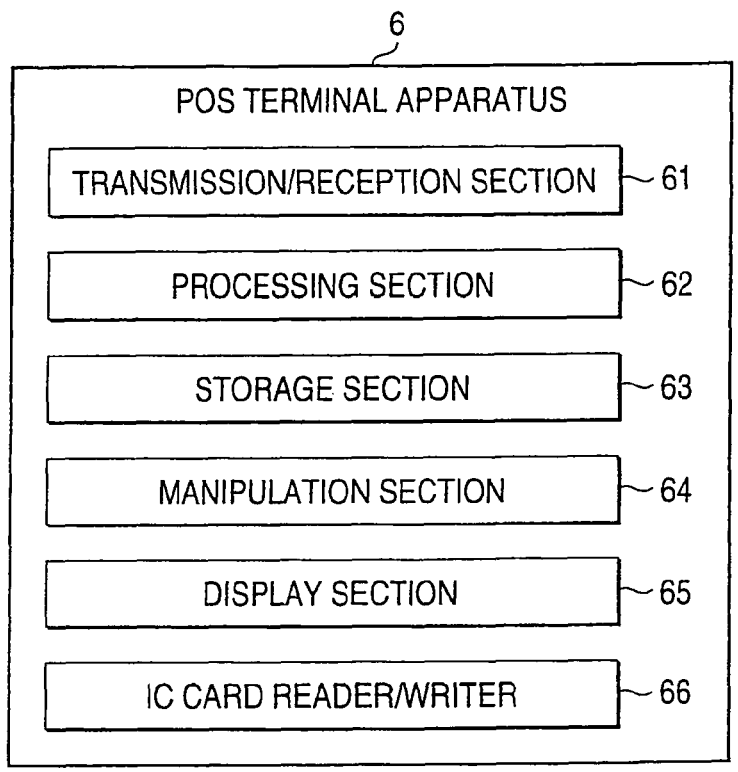
FIG. 6 is a functional block diagram of the POS terminal apparatus shown in FIG. 1.

FIG. 6 is a functional block diagram of the POS terminal apparatus 6.

The POS terminal apparatus 6, which is installed in a store or the like, has, for example, a transmission/reception section 61, a processing section 62, a storage section 63, a manipulation section 64, a display section 65, and an IC card reader/writer 66, as shown in FIG. 6.

The transmission/reception section 61 sends and receives a request or information to and from the settlement server apparatus 7 via the network 8 (see FIG. 1).

The processing section 62 performs prescribed processing in accordance with a manipulation signal that is input through the manipulation section 64 or a request or information that is received from the settlement server apparatus 7.

The storage section 63 stores various kinds of information that are necessary for processing of the POS terminal apparatus 6.

The manipulation section 64 generates a manipulation signal in accordance with a manipulation that is performed by a store clerk or the like by using a mouse, a keyboard, or the like, and outputs it to the processing section 62.

The display section 65 displays a picture corresponding to the display signal that is input from the processing section 62.

The IC card reader/writer 66 writes and reads information to and from an IC card 3 under the control of the processing section 62.

When a user buys a commodity in the store, the POS terminal apparatus 6 performs input of a price, causes the IC card reader/writer 66 to read a user ID from an IC card 3, and performs other operations in accordance with manipulations on the manipulation section 64 by a clerk or the like and sends a settlement request including the price and the user ID to the settlement server apparatus 7 via the transmission/reception section 61.

Further, the POS terminal apparatus 6 receives an authentication result indicating whether the IC card 3 is a legitimate one from the settlement server apparatus 7 and displays it on the display section 65.

Settlement Server Apparatus 7

The settlement server apparatus 7 is a server apparatus that performs, using an IC card 3, settlement on, for example, a user's buying of a commodity in a store.

Figure 7:
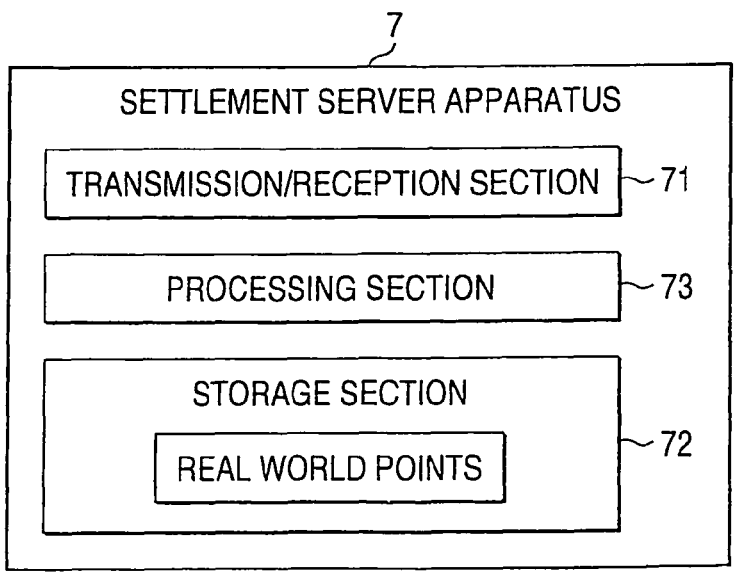
FIG. 7 is a functional block diagram of the settlement server apparatus shown in FIG. 1.

FIG. 7 is a functional block diagram of the settlement server apparatus 7. As shown in FIG. 7, the settlement server apparatus 7 has a transmission/reception section 71, a storage section 72, and a processing section 73.

The transmission/reception section 71 not only sends and receives a request or information to and from the POS terminal apparatus 6 via the network 8 but also sends and receives a request or information to and from the network transaction server apparatus 4 via the network 9.

The storage section 72 stores a user ID, a password, and personal information of each registered user who owns an IC card 3.

The storage section 72 stores real world privilege information (the second privilege information in the invention; e.g., a point) that has been issued to a user in accordance with transactions conducted by him in the real world 11 in such a manner that it is correlated with his user ID.

The real world privilege information is information that is issued in accordance with an act performed by each user in the real world 11 and is used for judging his credibility or contribution to the real world 11. In accordance with real world privilege information that each user has acquired, an upper amount of money he is allowed to use in the real world 11 is set or he is given a certain profit, such as digital cash, or a discount from a commodity price.

The storage section 72 stores a conversion factor that is used in converting virtual world privilege information into real world privilege information.

The processing section 73 performs the following processing in accordance with a request from the POS terminal apparatus 6 or the personal computer 2.

Figure 8:
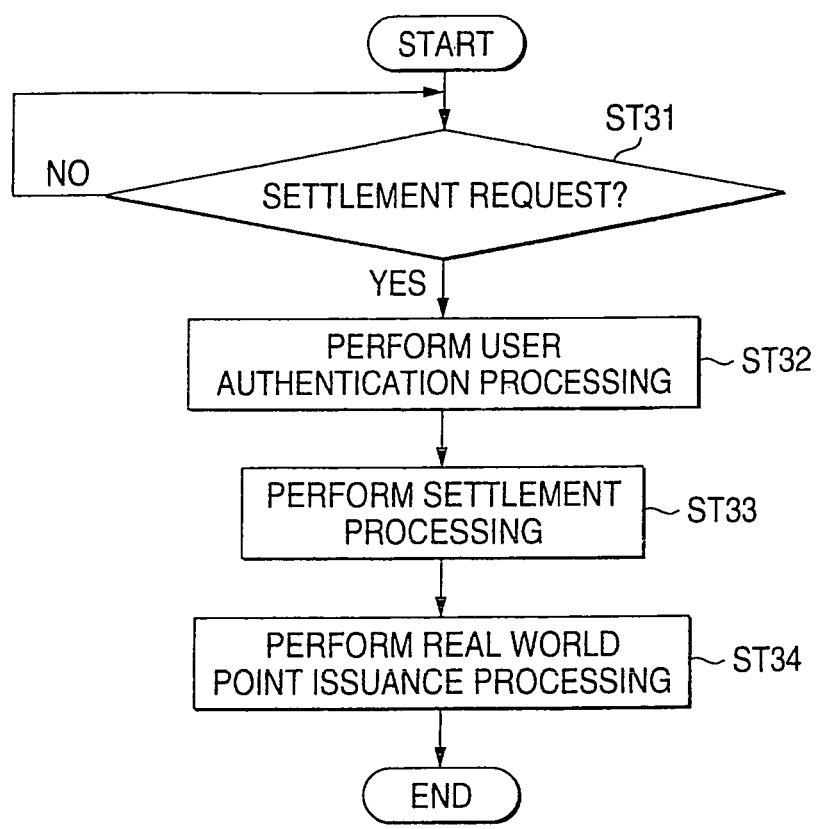
FIG. 8 is a flowchart showing the process that is executed by the processing section of the settlement-server apparatus shown in FIG. 7 when it receives a settlement request from the POS terminal apparatus shown in FIG. 1.

First, a description will be given of processing that is performed when the processing section 73 receives a settlement request from the POS terminal 6. FIG. 8 is a flowchart of this process.

Step ST31: If the processing section 73 judges that the transmission/reception section 71 has received a settlement request from the POS terminal apparatus 6, the processing section 73 moves to step ST32. If it judges otherwise, the processing section 73 executes step ST31 repeatedly.

Step ST32: Using a user ID that is received from the POS terminal apparatus 6 and information of the user that is stored in the storage section 72, the processing section 73 performs user authentication processing in which whether the user is a legitimate user who is registered is judged. If the legitimacy of the user is confirmed, the processing section 73 moves to step ST33.

Step ST33: The processing section 73 performs settlement processing for the user using the user ID and price information that have been received from the POS terminal apparatus 6.

Step ST34: The processing section 73 issues real world privilege information for the settlement for the user according to predetermined standards, adds the issued real world privilege information to total real world privilege information that the user has acquired so far, and writes updated total real world privilege information to the storage section 72. At this time, the processing section 73 issues real world privilege information in accordance with the amount of money settled.

Figure 9:
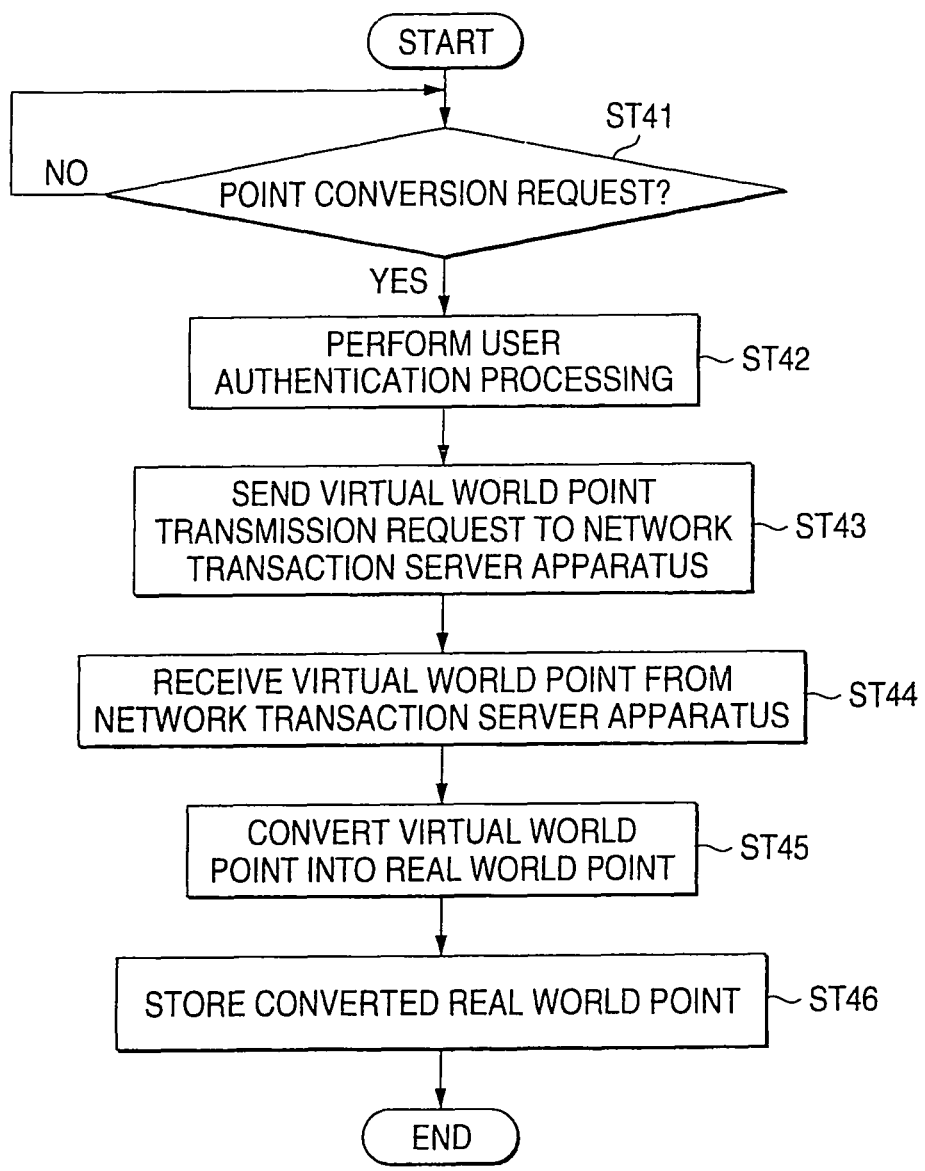
FIG. 9 is a flowchart showing a process that is executed by the processing section of the settlement server apparatus shown in FIG. 7 when it receives a privilege information conversion request from the personal computer via the network-transaction server apparatus shown in FIG. 1.

Next, a description will be given of processing that is performed by the processing section 73 when it receives a privilege information conversion request from the personal computer 2 via the network transaction server apparatus 4. FIG. 9 is a flowchart of this process.

Step ST41: If the processing section 73 judges that the transmission/reception section 71 has received a privilege information conversion request from the personal computer 2, the processing section 73 moves to step ST42. If it judges otherwise, the processing section 73 executes step ST41 repeatedly.

Step ST42: Using a user ID that is received from the personal computer 2 and information of the user that is stored in the storage section 72, the processing section 73 performs user authentication processing in which whether the user is a legitimate user who is registered is judged. If the legitimacy of the user is confirmed, the processing section 73 moves to step ST43.

Step ST43: The processing section 73 sends the network transaction server apparatus 4 a virtual world privilege information transmission request that requests transmission of virtual world privilege information of the user.

Step ST44: The processing section 73 receives virtual world privilege information of the user from the network transaction server apparatus 4.

Step ST45: The processing section 73 converts the virtual world privilege information that was received at step ST44 into real world privilege information using the predetermined conversion factor that is read from the storage section 72.

Step ST46: The processing section 73 adds the real world privilege information that was obtained by the conversion at step ST45 to real world privilege information that the user has acquired so far and stores updated real world privilege information in the storage section 72.

As described above, in communication system 1, virtual world privilege information that a user has acquired in accordance with acts that he has performed in the virtual world 10 is converted into real world privilege information in response to a request from him. Therefore, the user can cause a service that is provided by the settlement server apparatus 7 or the like to him in the real world 11 in accordance with his credibility or contribution to reflect his credibility or position that he has acquired in accordance with the acts that he has performed in the virtual world 10.

The invention is not limited to the above embodiment.

In the embodiment, virtual world privilege information that a user has acquired in the virtual world 10 is converted, in response to a request from him, into real world privilege information that is used in the real world 11. Conversely, real world privilege information that a user has acquired in the real world 11 may be converted, in response to a request from him, into virtual world privilege information that is used in the virtual world 10.

In the embodiment, virtual world privilege information is stored in the network transaction server apparatus 4 and real world privilege information is stored in the settlement server apparatus 7. However, at least one of virtual world privilege information and real world privilege information may be stored in the built-in memory of the IC card 3.

As described above, the invention can provide a communication system and an information processing method that allow a user to use the privilege information that he or she has acquired in one of a virtual world on a real world in the other world in the case where the privilege information is issued in accordance with an act that is performed by him or her in each world.

The privilege information allows a customer/user to obtain an incentive, such as an addable point, an amount of money corresponding to an upper limit service a user can receive, such as an upper limit usable amount of money of a card, and an electronic value that can be replenished and used, such as digital cash.

What is claimed is:

1. A communication system comprising:
    an IC card including a unique user identifier corresponding to a user;
    a first management apparatus configured to
        generate first type information based on a first transaction conducted between the first management apparatus and a first terminal including a first IC card interface that receives the user identifier from the IC card and transfers the user identifier to the first management apparatus, and
        manage the first type information by associating the user identifier with the first type information when the user identifier is received from the first IC card interface;
    a second management apparatus that is separate from the first management apparatus and is configured to
        generate second type information based on a second transaction conducted between the second management apparatus and a second terminal including a second IC card interface that receives the user identifier from the IC card and transfers the user identifier to the second management apparatus, and
        manage the second type information by associating the user identifier with the second type information when the user identifier received from the second IC card interface;
    wherein the second management apparatus includes a processing section that is configured to convert the first type information into the second type information based on a conversion factor and to combine the converted first type information with the second type information, in response to a combination request received through the first management apparatus.

2. The communication system according to claim 1, wherein the first management apparatus includes a processing section that converts the second type information into the first type information based on a conversion factor and combines the converted second type information with the first type information, in response to a combination request received through the second management apparatus.

3. The communication system according to claim 1, wherein at least one of the first type information and the second type information has an empirical value.

4. The communication system according to claim 1, wherein the first type information and the second type information include point information.

5. The communication system according to claim 4, wherein
the first management apparatus generates and accumulates the first type information from subsequent transactions including the first management apparatus and the user identifier; and
the second management apparatus generates and accumulates the second type information from subsequent transactions including the second management apparatus and the user identifier.

6. The communication system according to claim 1, wherein
the first management apparatus performs settlement processing in response to a settlement request for a transaction initiated by the first terminal detecting the IC; and
the second management apparatus performs settlement processing in response to a settlement request for a transaction initiated by the second terminal detecting the IC.

7. The communication system according to claim 1, wherein the first management apparatus generates the first type information based on acts performed in the virtual world that represent a credibility or a contribution in a virtual world.

8. The communication system according to claim 1, wherein the second management apparatus generates the second type information in accordance with a credibility or a contribution in a real world.

9. The communication system according to claim 1, wherein the first type information is stored within a first storage section of the first management apparatus, and
wherein the second type information is stored within a second storage section of the second management apparatus.

10. An information processing method, comprising:
receiving a user identifier of an IC card from a first IC card interface of a first terminal that transfers the user identifier to a first management apparatus;
generating, by the first management apparatus, a first type information based on a first transaction conducted between the first management apparatus and the first terminal using the user identifier;
managing, by the first management apparatus, the first type information by associating the user identifier with the first type information when the user identifier is received from the first IC card interface;
receiving the user identifier of the IC card from a second IC card interface of a second terminal that transfers the user identifier to a second management apparatus that is separate from the first management apparatus;
generating, by the second management apparatus, a second type information based on a second transaction conducted between the second management apparatus and the second terminal using the user identifier; and
managing, by the second management apparatus, the second type information by associating the user identifier with the second type information when the user identifier is received from the second IC card interface;
wherein, in response to a combination request received through the first management apparatus:
converting, by a processing section of the second manager apparatus, the first type information into second type information based on a conversion factor, and
combining, by the processing section of the second management apparatus, the converted first type information with the second type information.

11. The information processing method according to claim 10, wherein, in response to a combination request received through the second management apparatus:
converting, by a processing section of the first manager apparatus, the second type information into first type information based on a conversion factor, and
combining, by the processing section of the first management apparatus, the converted second type information with the first type information.

12. The information processing method according to claim 10, wherein the first type information is converted into the second type information according to a predetermined conversion factor.

13. The information processing method according to claim 10, wherein at least one of the first type information and the second type information has an empirical value.

14. The information processing method according to claim 10, wherein the first type information and the second type information include point information.

15. The information processing method according to claim 14, wherein at least one of the first management apparatus and the second management apparatus issue the point.

16. The information processing method according to claim 10, further comprising:
accumulating the first type information generated from subsequent transactions by the first management apparatus using the user identifier by the first terminal detecting the IC; and
accumulating the second type information generated from subsequent transactions by the second management apparatus using the user identifier by the second terminal detecting the IC.

17. The information processing method according to claim 10, wherein the first management apparatus generates the first type information based on acts performed by the user in the virtual world that represent a credibility or a contribution of the user in the virtual world.

18. The information processing method according to claim 10, wherein the second management apparatus generates the second type information in accordance with a credibility of the user or a contribution by the user in the real world.

19. The information processing method according to claim 10, wherein the first type information is stored within a first storage section of the first management apparatus, and
wherein the second type information is stored within a second storage section of the second management apparatus.

* * * * *